(12) United States Patent
Massari et al.

(10) Patent No.: US 7,772,324 B2
(45) Date of Patent: Aug. 10, 2010

(54) ELASTOMERIC POLYOLEFIN COMPOSITIONS

(75) Inventors: Paola Massari, Ferrara (IT); Andreas Newmann, Ferrara (IT); Gianni Collina, Ferrara (IT); Ofelia Fusco, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 711 days.

(21) Appl. No.: 11/664,575

(22) PCT Filed: Sep. 5, 2005

(86) PCT No.: PCT/EP2005/054370

§ 371 (c)(1),
(2), (4) Date: Apr. 3, 2007

(87) PCT Pub. No.: WO2006/037705

PCT Pub. Date: Apr. 13, 2006

(65) Prior Publication Data

US 2008/0071032 A1    Mar. 20, 2008

Related U.S. Application Data

(60) Provisional application No. 60/616,824, filed on Oct. 7, 2004.

(30) Foreign Application Priority Data

Oct. 4, 2004    (EP) .................................. 04023627

(51) Int. Cl.
*C08L 23/00*    (2006.01)
*C08L 23/04*    (2006.01)
*C08L 23/10*    (2006.01)

(52) U.S. Cl. .................. 525/191; 525/232; 525/240

(58) Field of Classification Search ................. 525/191, 525/232, 240

See application file for complete search history.

(56) References Cited

U.S. PATENT DOCUMENTS

| | | |
|---|---|---|
| 3,200,173 A | 8/1965 | Schilling |
| 3,629,368 A | 12/1971 | Fukuda et al. |
| 3,670,053 A | 6/1972 | Sennari et al. |
| 4,298,718 A | 11/1981 | Mayr et al. |
| 4,399,054 A | 8/1983 | Ferraris et al. |
| 4,469,648 A | 9/1984 | Ferraris et al. |
| 4,495,338 A | 1/1985 | Mayr et al. |
| 4,522,930 A | 6/1985 | Albizzati et al. |
| 5,145,819 A | 9/1992 | Winter et al. |
| 5,324,800 A | 6/1994 | Welborn, Jr. et al. |
| 6,313,227 B1 | 11/2001 | Tanaka et al. |
| 7,482,406 B2 * | 1/2009 | News et al. ................. 525/240 |
| 7,572,860 B2 * | 8/2009 | De Palo et al. ............. 525/191 |
| 2007/0203298 A1 * | 8/2007 | Massari et al. ............. 525/191 |
| 2008/0167428 A1 * | 7/2008 | Massari et al. ............. 525/240 |

FOREIGN PATENT DOCUMENTS

| | | |
|---|---|---|
| EP | 45977 | 2/1982 |
| EP | 77532 | 4/1983 |
| EP | 129368 | 12/1984 |
| EP | 361493 | 4/1990 |
| EP | 416815 | 3/1991 |
| EP | 420436 | 4/1991 |
| EP | 485823 | 5/1992 |
| EP | 643066 | 3/1995 |
| EP | 671404 | 9/1995 |
| EP | 728769 | 8/1996 |
| EP | 782587 | 7/1997 |
| WO | 91/04257 | 4/1991 |
| WO | 00/63261 | 10/2000 |
| WO | 01/57099 | 8/2001 |
| WO | 02/30998 | 4/2002 |
| WO | 03/051984 | 6/2003 |
| WO | 2004/013193 | 2/2004 |
| WO | 2004/087807 | 10/2004 |
| WO | 2005/113672 | 12/2005 |

OTHER PUBLICATIONS

Y. Inoue et al., "Studies of the stereospecific polymerization mechanism of propylene by a modified Ziegler-Natta catalyst based on 125 MHz $^{13}$C n.m.r. spectra," *Polymer*, vol. 25, p. 1640-1644 (1984).

R. Chûjö et al., "Two-site model analysis of $^{13}$C n.m.r. of polypropylene polymerized by Ziegler-Natta catalysts with external alkoxysilane donors," *Polymer*, vol. 35(2), p. 339-342 (1994).

* cited by examiner

*Primary Examiner*—Nathan M Nutter
(74) *Attorney, Agent, or Firm*—Jarrod N. Raphael

(57) ABSTRACT

An olefin polymer composition comprising (by weight, unless otherwise specified): A) 60-85% of a crystalline propylene homopolymer or a crystalline copolymer of propylene containing 3% or less of ethylene or $C_4$-$C_{10}$ α-olefin(s) or of combinations thereof, said homopolymer or copolymer having a Polydispersity Index (P.I.) value of from 4.5-6 and a content of isotactic pentads (mmmm), measured by $^{13}$C NMR on the fraction insoluble in xylene at 25° C., higher than 96%; B) 15-40% of a partially amorphous copolymer of ethylene containing from 35% to 70% of propylene or $C_4$-$C_{10}$ α-olefin(s) or of combinations thereof, and optionally minor proportions of a diene. The said olefin polymer composition exhibits a value of elongation at break ranging from 150 to 600% according to ISO method 527.

7 Claims, No Drawings

ELASTOMERIC POLYOLEFIN COMPOSITIONS

The present invention concerns elastomeric polyolefin compositions and the process for their preparation.

As is known, isotactic polypropylene, though being endowed with an exceptional combination of excellent properties, is affected by the drawback of insufficient impact resistance at relatively low temperatures and low elongation properties.

According to the teachings of the prior art, it is possible to obviate the said drawbacks, without sensibly affecting the other polymer properties, by adding rubber. This is obtained by modifying the synthesis process or by blending polypropylene with rubbers.

The modification of the synthesis process comprises, after polymerizing propylene to isotactic polymer, copolymerizing ethylene and propylene mixtures in the presence of the isotactic polymer. Processes and compositions representative of the prior art are described in U.S. Pat. No. 3,200,173, U.S. Pat. No. 3,629,368, U.S. Pat. No. 3,670,053, U.S. Pat. No. 6,313,227 and European patent application No. 0 077 532.

The polyolefin compositions described in EP application 03007669.9 (published as WO2004/087807) possess high rigidity and good impact resistance. The said balance of properties is achieved by a composition that comprises (A) a high crystalline propylene homopolymer or copolymer having a broad polydispersity index and (B) an elastomeric ethylene copolymer and in which the ethylene content of the fraction collected at 90° C. as a result of temperature rising elution fractionation (TREF) satisfies a specific relation. The drawback of said compositions is that they do not have satisfactory elongation.

The polyolefin compositions described in EP application No. 4012148.5 possess high elongation at break and good impact resistance. The drawback that rigidity is not so high when the elongation is high. Compositions with high values of elongation at break contain high amounts of elastomeric polymer.

It has now been found that it is possible to obtain polypropylene compositions with a particularly advantageous balance of properties, in particular high elongation at break and good impact resistance without a remarkable decrease in rigidity properties.

The advantage of the composition according to the present invention is that high elongation properties are achieved by a relative low content of elastomeric polymer in the composition.

Another advantage is the relative high stiffness of the composition in spite of the fact that the composition exhibits high elongation at break values.

Another advantage is that articles prepared with the composition according to the present invention can be used for several applications at low temperatures without failure of the articles due to the good impact resistance in terms of both ductile/brittle transition temperature and Izod impact resistance.

The composition according to the present invention can be easily converted into various kinds of finished and semi-finished articles, in particular by using injection-moulding and thermoforming techniques. The particular balance of properties and high values of elongation at break make the present composition suitable for the automotive field, in particular for bumpers.

Thus the present invention relates to an olefin polymer composition comprising (by weight, unless otherwise specified):

A) 60-85%, preferably 65-80%, more preferably 65-75%, of a crystalline propylene homopolymer or a crystalline copolymer of propylene containing 3% or less of ethylene or $C_4$-$C_{10}$ α-olefin(s) or of combinations thereof, said homopolymer or copolymer having a Polydispersity Index (P.I.) value of from 4.5-6, preferably 4.5-5.5, and a content of isotactic pentads (mmmm), measured by $^{13}$C NMR on the fraction insoluble in xylene at 25° C., higher than 96%, preferably higher than 98%;

B) 15-40%, preferably 20-35%, more preferably 25-35%, of a partially amorphous copolymer of ethylene containing from 35% to 70%, preferably from 40 to 55%, of propylene or $C_4$-$C_{10}$ α-olefin(s) or of combinations thereof, and optionally minor proportions of a diene.

The olefin polymer composition according to the present invention exhibits a value of elongation at break ranging from 150 to 600%, preferably 200-500%, according to ISO method 527.

Particularly preferred features of the composition of the present invention are:

a molecular weight distribution in component (A), expressed by the $\overline{M}w/\overline{M}n$ ratio, measured by GPC, ranging from 6 to 9;

a value of $\overline{M}z/\overline{M}w$ ratio in component (A), measured by GPC, equal to or higher than 2.5, in particular from 2.5 to 4.5, typically 3-4; and Flexural Modulus (according to ISO178) from 700 to 1500 MPa, more preferably from 900 to 1300 MPa;

Melt Flow Rate (MFR) from 0.5 to 45 g/10 min., more preferably from 2 to 20 g/10 min. (according to ISO1133, measured at 230° C., 2.16 kg load).

The composition according to the present invention preferably exhibits values of impact resistance in terms of ductile/brittle transition temperature less than −50° C. The Izod impact resistance of the said composition is preferably over 12 kJ/m² at 23° C. and over 7 kJ/m² at 0° C.

The term "copolymer" as used herein refers to both polymers with two different recurring units and polymers with more than two different recurring units, such as terpolymers, in the chain.

Component (A) is Preferably a Propylene Homopolymer

The stereoregularity of the polymer of component (A) is of the isotactic type.

The copolymers of components (A) and (B) contain recurring units derived from ethylene and/or butene-1, pentene-1, 4-methyl-pentene-1, hexene-1 and octane-1 or combination thereof. The preferred comonomer is ethylene. The total quantity of copolymerized ethylene is preferably from 9 to 20% by weight. Copolymer (B) can optionally contain recurring units derived from a diene, conjugated or not, such as butadiene-1,1,4-hexadiene, 1,5-hexadiene and ethylidene-norbornene-1. The diene, when present, is typically present in an amount of from 0.5 to 10% by weight with respect to the weight of the copolymer.

As previously said, the compositions of the present invention can be prepared with a polymerization process comprising at least two stages, where in the first stage the relevant monomer(s) are polymerized to form component (A) and in the following stage(s) the mixtures ethylene-propylene, ethylene-propylene and one or more $C_4$-$C_{10}$ α-olefin(s), ethylene and one or more $C_4$-$C_{10}$ α-olefin(s) and, optionally, a diene, are polymerized to form component (B).

Thus, the present invention relates also to a process for preparing the previously said compositions by a sequential polymerization comprising at least two sequential steps, wherein components (A) and (B) are prepared in separate subsequent steps, operating in each step, except the first step, in the presence of the polymer formed and the catalyst used in the preceding step. The catalyst is added only in the first step, however its activity is such that it is still active for all the subsequent steps. Component (A) is preferably prepared in one or two polymerization stages. The order of the polymerization stages is not a critical process feature, however component (A) is preferably prepared before component (B).

The polymerization can occur in liquid phase, gas phase or liquid-gas phase.

For example, it is possible to carry out the propylene polymerization stage using liquid propylene as diluent, and the following copolymerization stage in gas phase, without intermediate stages except for the partial degassing of the propylene.

Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerization in a cascade of stirred gas-phase reactors which are connected in series and in which the pulverulent reaction bed is kept in motion by means of a vertical stirrer. The reaction bed generally comprises the polymer which is polymerized in the respective reactor.

Propylene polymerization to form component (A) can be done in the presence of ethylene and/or one or more $C_4$-$C_{10}$ α-olefin(s), such as for example butene-1, pentene-1,4-methylpentene-1, hexene-1 and octene-1, or combinations thereof.

As previously said, the copolymerization of ethylene with propylene (preferred) and/or other $C_4$-$C_{10}$ α-olefin(s) to form component (B) can occur in the presence of a diene.

Component (B) is partially soluble in xylene at ambient temperature (i.e. 25° C.). The amount of xylene-soluble fraction of component (B) at ambient temperature typically ranges from 60 to 92% by weight. The intrinsic viscosity of said fraction typically ranges from 1.8 to 4 dl/g, preferably 2.5-3.5 dl/g.

Reaction time, pressure and temperature relative to the polymerization steps are not critical, however it is better if the temperature is from 20 to 150° C., in particular from 50 to 100° C. The pressure can be atmospheric or higher.

The regulation of the molecular weight is carried out by using known regulators, hydrogen in particular.

The compositions of the present invention can also be produced by a gas-phase polymerisation process carried out in at least two interconnected polymerisation zones. The said type of process is illustrated in European patent application 782 587.

In detail, the above-mentioned process comprises feeding one or more monomer(s) to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downwards in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example from 50 to 120° C.

This process can be carried out under operating pressures of between 0.5 and 10 MPa, preferably from 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

Preferably the polymerization catalyst is a Ziegler-Natta catalyst comprising a solid catalyst component comprising:

a) Mg, Ti and halogen and at least two electron donor compounds, said catalyst component being characterized by the fact that at least one of the electron-donor compounds, which is present in an amount from 15 to 50% by mol with respect to the total amount of donors, is selected from esters of succinic acids which are not extractable, under the conditions described below, for more than 20% by mol and at least another electron donor compound which is extractable, under the same conditions, for more than 30% by mol;

b) an alkylaluminum compound and, optionally (but preferably);

c) one or more electron-donor compounds (external donor).

The esters of succinic acids not extractable for more than 20% by mol are defined as non-extractable succinates. The electron-donor compounds extractable for more than 30% by mol are defined as extractable electron-donor compounds.

Preferably, it is used a succinate which is not extractable for more than 15% and another electron donor compound which is extractable for more than 35%.

The non-extractable succinates are preferably selected from succinates of formula (I) below:

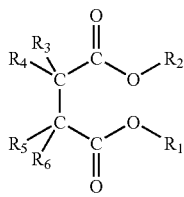

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen $R_6$ is a radical selected from primary branched, secondary or tertiary alkyl groups, cycloalkyl, aryl, arylalkyl or alkylaryl groups having from 3 to 20 carbon atoms, or a linear alkyl group having at least four carbon atoms optionally containing heteroatoms.

Preferably, the amount of non-extractable succinates is between 20 and 45% by mole, more preferably from 22 to 40% by mol, with respect to the total amount of the electron donor compounds. Among the non-extractable succinates mentioned above, particularly preferred are the succinates of formula (II) below:

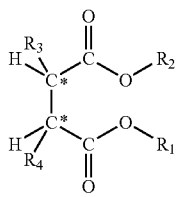

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, cycloalkyl, aryl, arylalkyl or alkylaryl group, optionally containing heteroatoms with the proviso that at least one of them is a branched alkyl; said compounds being, with respect to the two asymmetric carbon atoms identified in the structure of formula (II), stereoisomers of the type (S,R) or (R,S) that are present in pure forms or in mixtures.

Among the extractable electron-donor compounds particularly preferred are the esters of mono or dicarboxylic organic acids such as benzoates, malonates, phthalates and certain succinates. They are described in U.S. Pat. No. 4,522,930 and European patent 45977, for example. Particularly suited are the phthalic acid esters. Alkylphthalates are preferred, such as diisobutyl, dioctyl and diphenyl phthalate and benzyl-butyl phthalate.

The extractability test is carried out as follows.

A. Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2*2.8C_2H_5OH$ (prepared according to the method described in ex.2 of U.S. Pat. No. 4,399,054 but operating at 3,000 rpm instead of 10,000) are introduced. 4.4 mMoles of the selected electron donor compound are also added.

The temperature is raised to 100° C. and maintained at that temperature for 120 min. Then, the stirring is discontinued, the solid product is allowed to settle and the supernatant liquid is siphoned off.

250 ml of fresh $TiCl_4$ are added. The mixture is reacted at 120° C. for 60 min under stirring and, then, the supernatant liquid is siphoned off. The solid (A) is washed six times with anhydrous hexane (6×100 ml) at 60° C., dried under vacuum and analysed for the quantitative determination of Mg and electron donor compound. The ratio of the electron donor compound with respect to Mg (ratio A) is thus determined.

B. Treatment of Solid (A)

In a 250 ml jacketed glass reactor with mechanical stirrer and filtration septum are introduced under nitrogen atmosphere 190 ml of anhydrous n-hexane, 19 mMoles of $AlEt_3$ and 2 gr of the catalyst component prepared as described in A. The mixture is heated at 60° C. for 1 hour under stirring (stirring speed at 400 rpm). After that time the mixture is filtered, washed four times with n-hexane at 60° C. and finally dried under vacuum for 4 hours at 30° C. The solid is then analysed for the quantitative determination of Mg and electron donor compound. The molar ratio of the electron donor compound with respect to Mg (ratio B) is thus determined.

The extractability of the electron donor compound is calculated according to the following formula: % of ED extracted=(Ratio A−Ratio B)/Ratio A.

Preferred examples of the above-mentioned non-extractable succinates are the (S,R) (S,R) forms pure or in mixture, optionally in racemic form, examples of succinates to be used in the above said catalyst components are diethyl 2,3-bis (trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl) succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1,1,1-trifluoro-2-propyl)succinate, diisobutyl 2,3-n-propylsuccinate, diisobutyl 2,3-(9-fluorenyl)succinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3 bis(2-ethylbutyl)succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2-propyl)succinate, dineopentyl 2,3-n-propylsuccinate, dineopentyl 2,3(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, dineopentyl 2,3-diethyl-2,3-diisopropylsuccinate.

Particularly preferred are diethyl 2,3-dibenzylsuccinate, diethyl 2,3-diisopropylsuccinate, diethyl 2,3-bis(cyclohexylmethyl)succinate, diethyl 2,3-diisobutylsuccinate, diethyl 2,3-(1-trifluoromethyl-ethyl)succinate, diisobutyl 2,3-dibenzylsuccinate, diisobutyl 2,3-diisopropylsuccinate, diisobutyl 2,3-bis(cyclohexylmethyl)succinate, diisobutyl 2,3-n-propylsuccinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-diisobutylsuccinate, dineopentyl 2,3-n-propylsuccinate, dineopentyl 2-isopropyl-3-cyclohexylsuccinate.

The alkyl-Al compound (b) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

The external donor (c) can be of the same type or it can be different from the succinates of formula (I) and (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

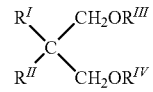

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

A particularly preferred class of external donor compounds is that of silicon compounds of formula $R_a^7R_b^8Si(OR^9)_c$, where a and b are integers from 0 to 2, c is an integer from 1 to 3 and the sum (a+b+c) is 4; $R^7$, $R^8$, and $R^9$, are $C_1$-$C_{18}$ hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexylmethyldimethoxysilane, diphenyldimethoxysilane, methyl-t-butyldimethoxysilane, dicyclopentyldimethoxysilane, 2-ethylpiperidinyl-2-t-butyldimethoxysilane and (1,1,1-trifluoro-2-propyl)-2-ethylpiperidinyldimethoxysilane, 3,3,3-trifluoropropyl-2-ethylpiperidyl-dimethoxysilane and (1,1,1-trifluoro-2-propyl)-methyldimethoxysilane. Moreover, are also preferred the silicon compounds in which a is 0, c is 3, $R^8$ is a branched alkyl or cycloalkyl group, optionally containing heteroatoms, and $R^9$ is methyl. Examples of such preferred silicon compounds are cyclohexyltrimethoxysilane, t-butyltrimethoxysilane and thexyltrimethoxysilane.

Particularly preferred specific examples of silicon compounds are cyclohexylmethyldimethoxysilane and dicyclopentyldimethoxysilane.

Preferably the electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably $MgCl_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula $Ti(OR)_{n-y}X_y$ can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound(s) can be added during the treatment with TiCl$_4$.

Regardless of the preparation method used, the final amount of the electron donor compound(s) is preferably such that the molar ratio with respect to the MgCl$_2$ is from 0.01 to 1, more preferably from 0.05 to 0.5.

The said catalyst components and catalysts are described in WO 00/63261, WO 01/57099 and WO 02/30998.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257.

The catalysts can be pre-contacted with small amounts of olefins (prepolymerization).

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as flexural modulus and HDT. Talc can also have a nucleating effect.

The particulars are given in the following examples, which are given to illustrate, without limiting, the present invention.

The data relating to the polymeric materials of the examples are determined by way of the methods reported below.

MFR: Determined according to ISO method 1133 (230° C., 2.16 kg).

Intrinsic viscosity [η]: Measured in tetrahydronaphthalene at 135° C.

$\overline{M}n$ (number average molecular weight), $\overline{M}w$ (weight average molecular weight) and $\overline{M}z$ (z average molecular weight): Measured by way of gel permeation chromatography (GPC) in 1,2,4-trichlorobenzene; in detail, the samples are prepared at a concentration of 70 mg/50 ml of stabilized 1,2,4 trichlorobenzene (250 μg/ml BHT (CAS REGISTRY NUMBER 128-37-0); the samples are then heated to 170° C. for 2.5 hours to solubilize; the measurements are run on a Waters GPCV2000 at 145° C. at a flow rate of 1.0 m/min. using the same stabilized solvent; three PolymerLab columns are used in series (Plgel, 20 μm mixed ALS, 300×7.5 mm).

Ethylene content: By IR spectroscopy.

Determination of isotactic pentads content 50 mg of each xylene insoluble fraction were dissolved in 0.5 mL of C$_2$D$_2$Cl$_4$.

The $^{13}$C NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (Polymer, 1984, 25, 1640, by Inoue Y. et Al. and Polymer, 1994, 35, 339, by Chujo R. et Al.).

Polydispersity Index (PI)

This is the measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G'=500 \text{ Pa})/(\text{frequency at } G''=500 \text{ Pa})$$

wherein G' is the storage modulus and G" is the loss modulus.

Fractions soluble and insoluble in xylene at 25° C.

2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum a 80° C. until constant weight is reached. Thus one calculates the percent by weight of polymer soluble and insoluble at room temperature (25° C.).

Flexural Modulus: Determined according to ISO method 178.

Izod Impact Resistance: Measured according to the ISO method 180/1A.

Determination of Ductile/Brittle transition temperature: Determined according to internal method MA 17324, available upon request.

According to this method, the bi-axial impact resistance is determined through impact with an automatic, computerised striking hammer.

The circular test specimens are obtained by cutting with circular hand punch (38 mm diameter). They are conditioned for at least 12 hours at 23° C. and 50 RH and then placed in a thermostatic bath at testing temperature for 1 hour.

The force-time curve is detected during impact of a striking hammer (5.3 kg, hemispheric punch with a 1.27 cm diameter) on a circular specimen resting on a ring support. The machine used is a CEAST 6758/000 type model no. 2.

D/B transition temperature means the temperature at which 50% of the samples undergoes fragile break when submitted to the said impact test.

The Plaques for D/B measurement, having dimensions of 127×127×1.5 mm are prepared according to the following method.

The injection press is a Negri Bossi™ type (NB 90) with a clamping force of 90 tons. The mould is a rectangular plaque (127×127×1.5 mm).

The main process parameters are reported below:

Back pressure (bar): 20

Injection time (s): 3

Maximum Injection pressure (MPa): 14

Hydraulic injection pressure (MPa): 6–3

First holding hydraulic pressure (MPa): 4±2

First holding time (s): 3

Second holding hydraulic pressure (MPa): 3±2

Second holding time (s): 7

Cooling time (s): 20

Mould temperature (° C.): 60

The melt temperature is between 220 and 280° C.

Elongation at break and elongation at yield: Determined according to ISO method 527.

EXAMPLE 1

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.8C_2H_5OH$ (prepared according to the method described in example 2 of U.S. Pat. No. 4,399,054 but operating at 3000 rpm instead of 10000 rpm), the following internal electron-donor compounds were added: 1.67 mmol of diethyl 2,3-diisopropylsuccinate in racemic form as non-extractable succinate, and 1.37 mmol of diethyl 2,3-diisopropylsuccinate in meso form and 4.56 mmol of diisobutylphthalate. The temperature was raised to 100° C. and maintained for 120 min. Then, the stirring was discontinued, the solid product was allowed to settle and the supernatant liquid was siphoned off. Then 250 ml of fresh $TiCl_4$ were added. The mixture was reacted at 120° C. for 60 min and, then, the supernatant liquid was siphoned off. The solid was washed six times with anhydrous hexane (6×100 ml) at 60° C.

Catalyst System and Pre-Polymerization Treatment

Before introducing it into the polymerization reactors, the solid catalyst component described above is contacted at 12° C. for 24 minutes with aluminum triethyl (TEAL) and dicyclopentyldimethoxysilane (DCPMS) in such quantity that the weight ratio of TEAL to the solid catalyst component be equal to 11, and the weight ratio TEAL/DCPMS be equal to 3.

The catalyst system is then subjected to prepolymerization by maintaining it in suspension in liquid propylene at 20° C. for about 5 minutes before introducing it into the first polymerization reactor.

Polymerization

The polymerization run is conducted in continuous mode in a series of three reactors equipped with devices to transfer the product from one reactor to the one immediately next to it. The first reactor is a liquid phase reactor; the second and third are a fluid bed gas phase reactors. Component (A) is prepared in the first reactor in liquid phase, while component (B) is prepared in said two reactors in gas phase.

Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions and the analytical data relating to the polymers produced in the three reactors are reported in Table 1.

Then the polymer particles are introduced in a rotating drum, wherein they are mixed with 0.15% by weight of Irganox B 225 (made of about 50% Irganox 1010 and 50% Irgafos 168, by Ciba Specialty Chemicals), and 0.05% by weight of Ca stearate, to obtain a nucleated composition. The previously said Irganox 1010 is pentaerytrityl tetrakis 3-(3,5-di-tert-butyl-4-hydroxyphenyl) propanoate, while Irgafos 168 is tris(2,4-di-tert-butylphenyl) phosphite.

8500 ppm of talc are also added as nucleating agent.

Then the polymer particles are extruded under nitrogen atmosphere in a twin screw extruder, at a rotation speed of 250 rpm and a melt temperature of 200-250° C.

The properties of the so obtained polymer are reported in Table 2.

COMPARATIVE EXAMPLE 1

The comparative polymer composition of Comparative Example 1 is made of (all amounts by weight):

A) 68% of a crystalline isotactic propylene homopolymer having MFRL of 80 g/10 min;

B) 32% of a propylene/ethylene copolymer containing 42% of ethylene;

The polymerisation process is carried out as in example 1, except that the catalyst component does not contain the extractable and non-extractable electron-donor compound, but only one electron-donor compound, the diethyl 2,3-diisopropylsuccinate in racemic form. The molar amount of diethyl 2,3-diisopropylsuccinate in racemic form present in the catalyst component is equal to the total amount of the internal electron-donor compounds of the Example 1. The catalyst system preparation and the pre-polymerization treatment is carried out as in Example 1. The propylene homopolymer is prepared in two reactors in liquid phase instead of in only one reactor. The polymerisation conditions are reported in Table 1.

COMPARATIVE EXAMPLE 2

The comparative polymer composition of Comparative Example 2 is made of (all amounts by weight):

A) 68% of a crystalline isotactic propylene homopolymer;

B) 32% of a propylene/ethylene copolymer containing 47% of ethylene.

The polymerisation process is carried out as in example 1, except that the catalyst component does not contain the extractable and non-extractable electron-donor compound but only one electron-donor compound, that is 9.1 mMol of diisobutylphthalate and the weight ratio TEAL/DCPMS is equal to 5.

The polymerisation conditions are reported in Table 1.

Tables 2 and 3 report the properties of the two comparative polymer compositions of Comparative Examples 1 and 2, said compositions being stabilized and nucleated as the composition of Example 1.

TABLE 1

| | | Comparative Examples | |
|---|---|---|---|
| POLYMERIZATION | Example 1 | 1 | 2 |
| 1st reactor in liquid phase - propylene homopolymer | | | |
| Temperature, °C. | 70 | 67 | 70 |
| Pressure, bar | 40 | 41 | 39.5 |
| Residence time, min | 72 | 32 | 62 |
| $H_2$ bulk, mol ppm | 12700 | 10,000 | 15,000 |
| Split, wt % | 70 | — | 68 |
| 2nd reactor in liquid phase | | | |
| Temperature, °C. | — | 67 | — |
| Pressure, bar | — | 41 | — |
| Residence time, min | — | 26 | — |
| $H_2$ bulk, mol ppm | — | 10,000 | — |
| Split, wt % (total) | — | 68 | — |
| 1st reactor in gas phase - ethylene/propylene elastomeric copolymer | | | |
| Temperature, °C. | 80 | 80 | 80 |
| Pressure, bar | 15 | 16 | 15 |
| Residence time, min | 13 | 13 | 15 |
| $C_2^-/C_2^- + C_3^-$, % | 0.25 | 0.23 | 0.36 |
| $H_2/C_2^-$, % | 0.054 | 0-055 | 0.053 |
| Split, wt % | 22 | — | — |
| 2nd reactor in gas phase - ethylene/propylene elastomeric copolymer | | | |
| Temperature, °C. | 80 | 80 | 80 |
| Pressure, bar | 16 | 20 | 20.8 |
| Residence time, min | 18 | 23 | 27 |
| $C_2^-/C_2^- + C_3^-$, % | 0.25 | 0.23 | 0.36 |
| $H_2/C_2^-$, % | 0.05 | 0.053 | 0.050 |
| Split, wt % (total) | 8 | 32 | 32 |

Notes:
$H_2$ bulk = hydrogen concentration in the liquid monomer; $C_2^-$ = ethylene; $C_3^-$ = propylene; Split = amount of polymer prepared in the concerned reactor, referred to the total weight;

TABLE 2

| | Example | Comparative Examples | |
|---|---|---|---|
| POLYMER ANALYSES | ple 1 | 1 | 2 |
| MFR of component (A), dg/min | 72 | 80 | 69 |
| MFR (total), dg/min | 13 | 15 | 19.1 |
| PI of component (A) | 5.4 | 5.7 | 5.0 |

TABLE 2-continued

| | Example | Comparative Examples | |
|---|---|---|---|
| POLYMER ANALYSES | ple 1 | 1 | 2 |
| Copolymerized $C_2^-$ (total), wt % | 12.9 | 12.5 | 15.1 |
| Copolymerized $C_2^-$ in component (B) wt % | 43 | 42 | 47 |
| Xylene-soluble I.V. (total), dl/g | 3.05 | 2.96 | 2.98 |
| Xylene-soluble fraction (total), wt % | 28.2 | 28.1 | 28.7 |
| X.I. (mmmm) in component (A), % | 98.3 | 98.0 | 98.6 |
| $\overline{M}w/\overline{M}n$ of component (A) | 7.7 | 13.5 | 7.7 |
| $\overline{M}z/\overline{M}w$ of component (A) | 3.5 | 8.6 | 3.5 |

Notes:
total = referred to the whole polymer composition; I.V. = Intrinsic Viscosity; X.I. (mmmm) = content of isotactic pentads in the fraction of (A) insoluble in xylene at 25° C.

TABLE 3

| | Example 1 | Comparative examples (nucleated) | |
|---|---|---|---|
| Properties of Polymer | (nucleated) | 1 | 2 |
| Elongation at break, % | 378 | 82 | 74 |
| Elongation at yield, % | 5.5 | 5.3 | 4.8 |
| Flexural Modulus, MPa | 1010 | 1150 | 988 |
| Izod at 23° C., kJ/m² | 49.2 | 13 | 17.2 |
| Izod at 0° C., kJ/m² | 10.3 | 9.3 | 11.5 |
| Izod at −20° C., kJ/m² | 6.3 | 7.5 | 9.2 |
| D/B transition temperature, °C. | <−50 | <−50 | <−50 |

Notes:
D/B = Ductile/Brittle transition temperature.

The invention claimed is:

1. An olefin polymer composition comprising (by weight):
   (A) 60-85% of a crystalline propylene homopolymer or a crystalline propylene copolymer comprising 3% or less of ethylene, at least one $C_4$-$C_{10}$ α-olefin, or combinations thereof, the crystalline propylene homopolymer or copolymer comprising a Polydispersity Index value ranging from 4.5-6, and an isotactic pentads content (mmmm) higher than 96%, measured by $^{13}C$ NMR on a fraction insoluble in xylene at 25° C.;
   (B) 15-40% of a partially amorphous copolymer of ethylene comprising from 35% to 70% of propylene, at least one $C_4$-$C_{10}$ α-olefin, or combinations thereof, and optionally minor proportions of a diene;
the olefin polymer composition comprising an elongation at break ranging from 150 to 600% according to ISO method 527, an Izod impact resistance over 12 kJ/m² at 23° C. and 7 kJ/m² at 0° C. according to ISO method 180/1A, and a flexural ranging from 700 MPa to 1500 MPa according to ISO method 178.

2. The olefin polymer composition of claim 1, wherein the crystalline propylene homopolymer or copolymer ranges from 65-80 wt %, and the amorphous copolymer ranges from 20-35 wt %.

3. The composition of claim 1, wherein component (A) comprises a molecular weight distribution ranging from 6 to 9, expressed by $\overline{M}w/\overline{M}n$ ratio and measured by GPC.

4. A polymerization process for preparing an olefin polymer composition comprising (by weight):
   (A) 60-85% of a crystalline propylene homopolymer or a crystalline propylene copolymer comprising 3% or less of ethylene, at least one $C_4$-$C_{10}$ α-olefin, or combinations thereof, the crystalline propylene homopolymer or copolymer comprising a Polydispersity Index value ranging from 4.5-6, and an isotactic pentads content (mmmm) higher than 96%, measured by $^{13}C$ NMR on a fraction insoluble in xylene at 25° C.;

(B) 15-40% of a partially amorphous copolymer of ethylene comprising from 35% to 70% of propylene, at least one $C_4$-$C_{10}$ α-olefin, or combinations thereof, and optionally minor proportions of a diene;

the olefin polymer composition comprising an elongation at break ranging from 150 to 600% according to ISO method 527, an Izod impact resistance over 12 kJ/m² at 23° C. and 7 kJ/m² at 0° C. according to ISO method 180/1A, and a flexural ranging from 700 MPa to 1500 MPa according to ISO method 178, wherein the process comprises at least one Ziegler-Natta catalyst and at least two sequential steps, and components (A) and (B) are prepared in separate, subsequent steps, with each step subsequent to the first step operating in presence of a polymer formed and catalyst used in the preceding step, and wherein the Ziegler-Natta catalyst comprises a solid catalyst component, the solid catalyst component comprises:

(a) Mg, Ti, halogen, and at least two electron donor compounds, the solid catalyst component comprising from 15 to 50% by mol of at least one of the electron donor compounds, with respect to a total amount of the electron donor compounds, and wherein at least one of the electron donor compounds is selected from at least one ester of a succinic acid, the ester of the succinic acid not being extractable by more than 20% by mol, and the other electron donor compound being more extractable by than 30% by mol;

(b) an alkylaluminum compound; and (c) optionally, at least one additional electron-donor compound.

5. The process according to claim 4, wherein the ester of the succinic acid is of formula (I):

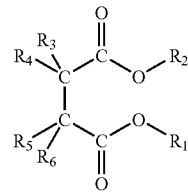

wherein $R_1$ and $R_2$ are equal to or different from each other, and are a $C_1$-$C_{20}$ linear or branched alkyl, alkenyl, cycloalkyl, aryl, arylalkyl or alkylaryl, wherein at least one of $R_1$ and $R_2$ optionally comprise at least one heteroatom; and $R_3$ to $R_6$ are equal to or different from each other, and are hydrogen or a $C_1$-$C_{20}$ linear or branched alkyl, alkenyl, cycloalkyl, aryl, arylalkyl or alkylaryl, wherein at least one of $R_3$ to $R_6$ optionally comprising at least one heteroatom, and optionally any two substituents selected from $R_3$-$R_6$ which are joined to the same carbon atom are linked together to form a cycle; with the proviso that when $R_3$ to $R_5$ are each hydrogen, $R_6$ is selected from primary branched, secondary, or tertiary alkyls, cycloalkyls, aryls, arylalkyls, or alkylaryls comprising from 3 to 20 carbon atoms, or a linear alkyl group comprising al least four carbon atoms and optionally comprising at least one heteroatom.

6. The olefin polymer composition of claim 1, wherein the composition comprises a flexural ranging from 900 MPa to 1300 MPa according to ISO method 178.

7. The polymerization process of claim 4, wherein the composition comprises a flexural ranging from 900 MPa to 1300 MPa according to ISO method 178.

\* \* \* \* \*